US005930353A

United States Patent [19]

Lee et al.

[11] Patent Number: 5,930,353

[45] Date of Patent: Jul. 27, 1999

[54] ELECTRICAL CONTACT FREE MICROPHONE ATTACHMENT FOR A FLIP-TYPE RADIO PHONE

[75] Inventors: Kang-Hoon Lee, Seongnam; Kyung-Jun Choen, Seoul, both of Rep. of Korea

[73] Assignee: Samsung Electronics Co., Ltd., Rep. of Korea

[21] Appl. No.: 08/968,152

[22] Filed: Nov. 17, 1997

[30] Foreign Application Priority Data

May 28, 1997 [KR] Rep. of Korea .......................... 97-21214

[51] Int. Cl.[6] .......................... H04M 1/00

[52] U.S. Cl. .......................... 379/433; 379/434

[58] Field of Search .......................... 379/433, 428, 379/434; 455/90, 575

[56] References Cited

U.S. PATENT DOCUMENTS 5,732,331 3/1998 Harms .......................... 379/433

5,799,079 8/1998 Inoue .......................... 379/433

*Primary Examiner*—Jack Chiang
*Attorney, Agent, or Firm*—Dilworth & Barrese

[57] ABSTRACT

An electrical contact free microphone attachment for a flip-type radio phone which has a flip, a microphone mounted in said flip, a main set, an audio circuit installed in the main set, and a connecting device for connecting the flip with the main set. The invention comprises a transformer having a primary coil, a secondary coil and a core. The primary coil is arranged in the flip to connect with the microphone. The secondary coil is arranged in the main set to connect with the audio circuit. The core is fixedly arranged in an axial hole formed in the connecting device.

12 Claims, 5 Drawing Sheets

ELECTRICAL CONTACT FREE MICROPHONE ATTACHMENT FOR A FLIP-TYPE RADIO PHONE

BACKGROUND OF THE INVENTION

1. Field of the Invention

The present invention relates to phones and more particularly, to a microphone attachment for a flip-type radio phone, which connects a microphone in the flip portion of the phone to the an audio circuit in the main set of the phone with no direct physical electrical contact.

2. Description of the Related Art

In the present specification, a radio phone is defined as including both a cellular phone set for establishing communications with base stations and a portable handset for establishing communications with an ordinary telephone set fixedly connected with the phone line.

The flip-type radio phone was developed in order to reduce the size of the radio phone. The flip-type radio phone includes a flip portion (the "flip") and a main set. The flip is attached to the main set by a hinge mechanism and is either closed to or opened from the main set. The communication mode of the radio phone is automatically set by opening the flip. Ideally, since a distance of at least about 14 cm is required from the mouth of the user to the ear, if the microphone is mounted in the flip, the length of the main set may be considerably reduced. This is because the length of the flip can compensate for the reduced length of the main set. However, in such a flip-type radio phone, if the flip is fractured or if the junction between the flip and the main set, which mechanically connects the microphone and the main set, is worn out, the radio phone cannot function properly.

SUMMARY OF THE INVENTION

It is an object of the present invention to provide a flip-type radio phone which functions properly even if the junction between the flip and the main set is worn out.

Another object of the present invention is to provide a flip-type radio phone with a microphone attachment for functionally connecting the microphone in the flip to the audio circuit of the main set without using direct physical electrical contact.

According to the present invention, an electrical contact free microphone attachment is provided, for a flip-type radio phone which has a flip, a microphone mounted in said flip, a main set, an audio circuit installed in the main set, and a connecting device for connecting the flip with the main set. The inventive microphone attachment comprises a transformer having a primary coil, a secondary coil and a core. The primary coil is arranged in the flip to connect with the microphone. The secondary coil is arranged in the main set to connect with the audio circuit. The core is fixedly arranged in an axial hole formed in the connecting device. Thus, a signal path is established between the microphone and the audio circuit with no direct physical electrical contact therebetween but rather an electromagnetic induction (e.g., transformer) coupled connection. It is to be understood that direct physical electrical contact refers to electrical connection between components wherein electrical contacts of, for instance, a connector or switch, physically touch one another in order to conduct a signal therebetween. By employing transformer coupled electrical connection, the present invention does not require direct physical electrical contacts.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Figure 1:
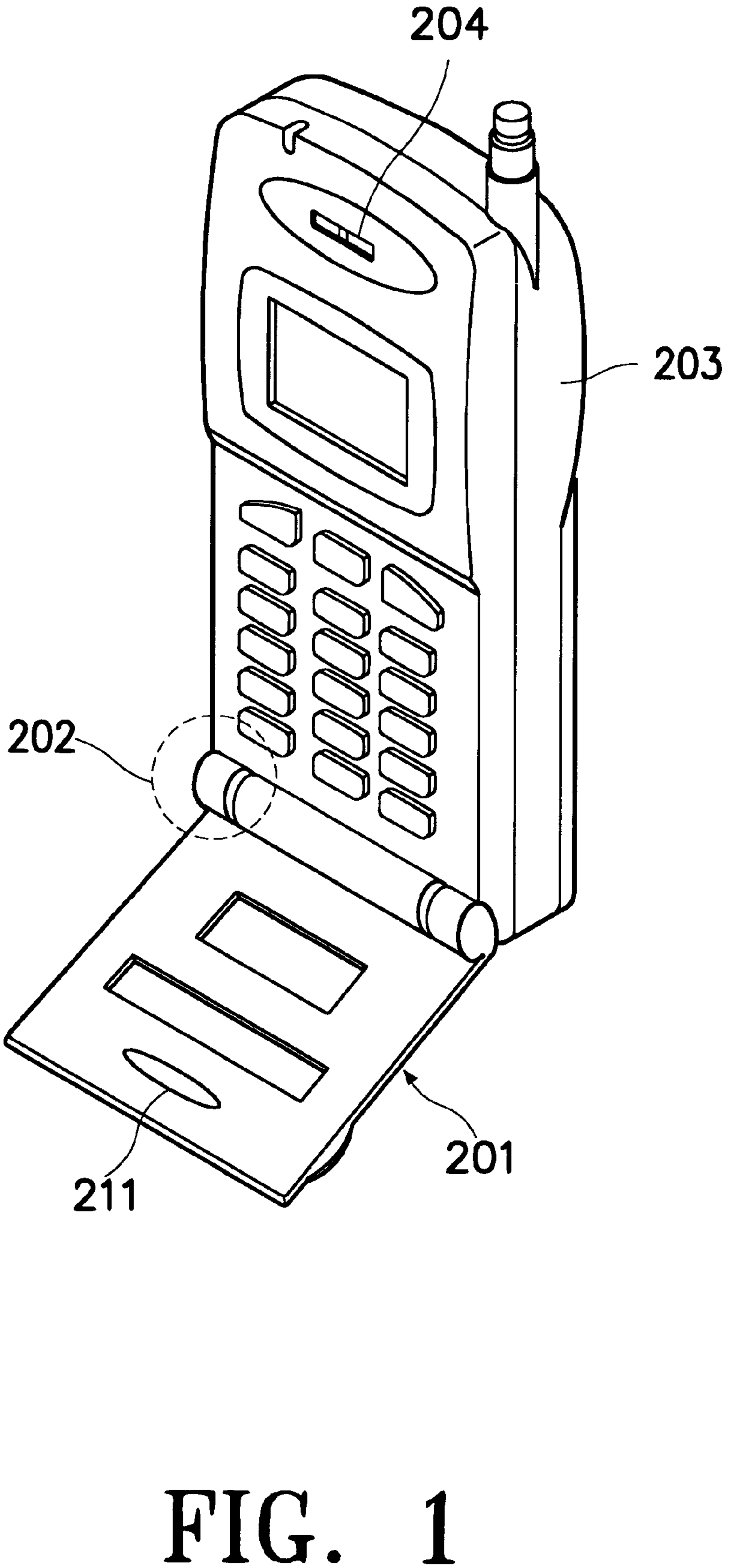
FIG. 1 is a perspective view illustrating a flip-type radio phone with a microphone attachment according to the present invention.

Referring to FIG. 1, a flip 201 is connected with a main set 203 by means of a connecting device 202. A microphone 211 is mounted in flip 201 to preferably provide at least 14 cm of distance between microphone 211 and a speaker 204 mounted in the main set 203 when flip 201 is in an open position.

Figure 2:
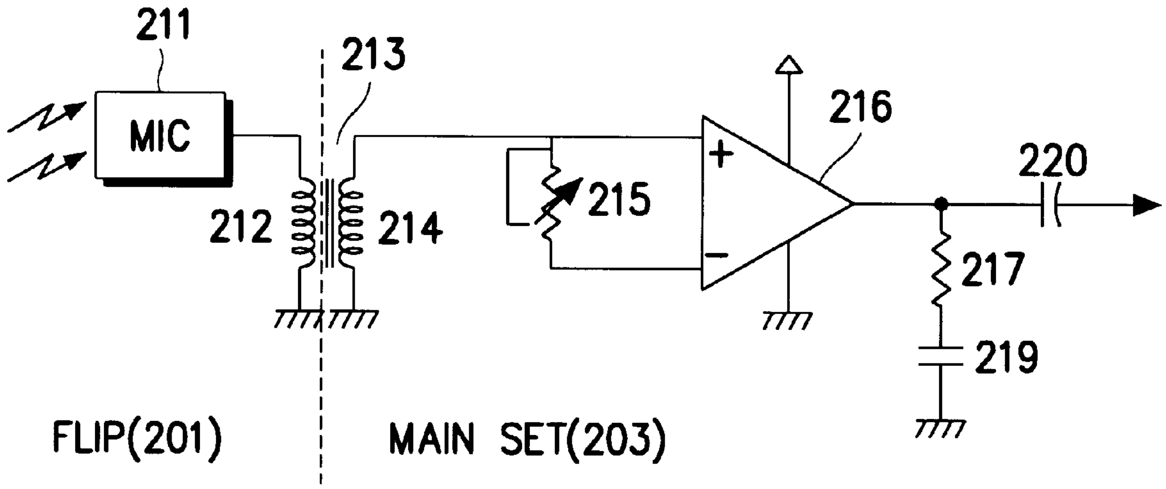
FIG. 2 is a circuit diagram illustrating a microphone attachment according to an embodiment of the present invention.

FIG. 2 is circuit diagram illustrating the electrical connection of flip 201 to main set 203 utilizing a microphone attachment according to a preferred embodiment of the present invention. In order to operatively connect microphone 211 with an audio circuit of the main set 203 without using direct physical electrical contacts, a transformer is employed. The primary coil 212 of the transformer is connected to microphone 211 and the secondary coil 214 is connected to an amplification circuit, as shown in FIG. 2. The amplification circuit includes: amplifier 216; a variable resistor 215 coupled between the inverting and non-inverting input terminals of amplifier 216; a resistor 217 having one end coupled to the output terminal of amplifier 216; a capacitor 219 having one end coupled to ground and its other end coupled to the other end of resistor 217; and a capacitor 220 having one end coupled to the output of amplifier 216 and its other end for connecting to a subsequent portion of the audio circuit. Thus, the voice signal generated in primary coil 212 is induced through the magnetic core 213 in secondary coil 214. The core 213 is made of a ferrite. The voice signal induced in secondary coil 214 is amplified by the amplifier 216 applied to a transmitter portion of the audio circuit (not shown).

The microphone 211 and primary coil 212 are arranged in flip 201 while secondary coil 214 is arranged in main set 203. The core 213 may be arranged in the flip part or the main set part of connecting device 202. In the present embodiment, it is arranged in the main set part. In this way, the voice signal generated by microphone 211 can be transmitted through the transformer to the audio circuit of the main set without using direct physical electrical contact therebetween.

Figure 3:
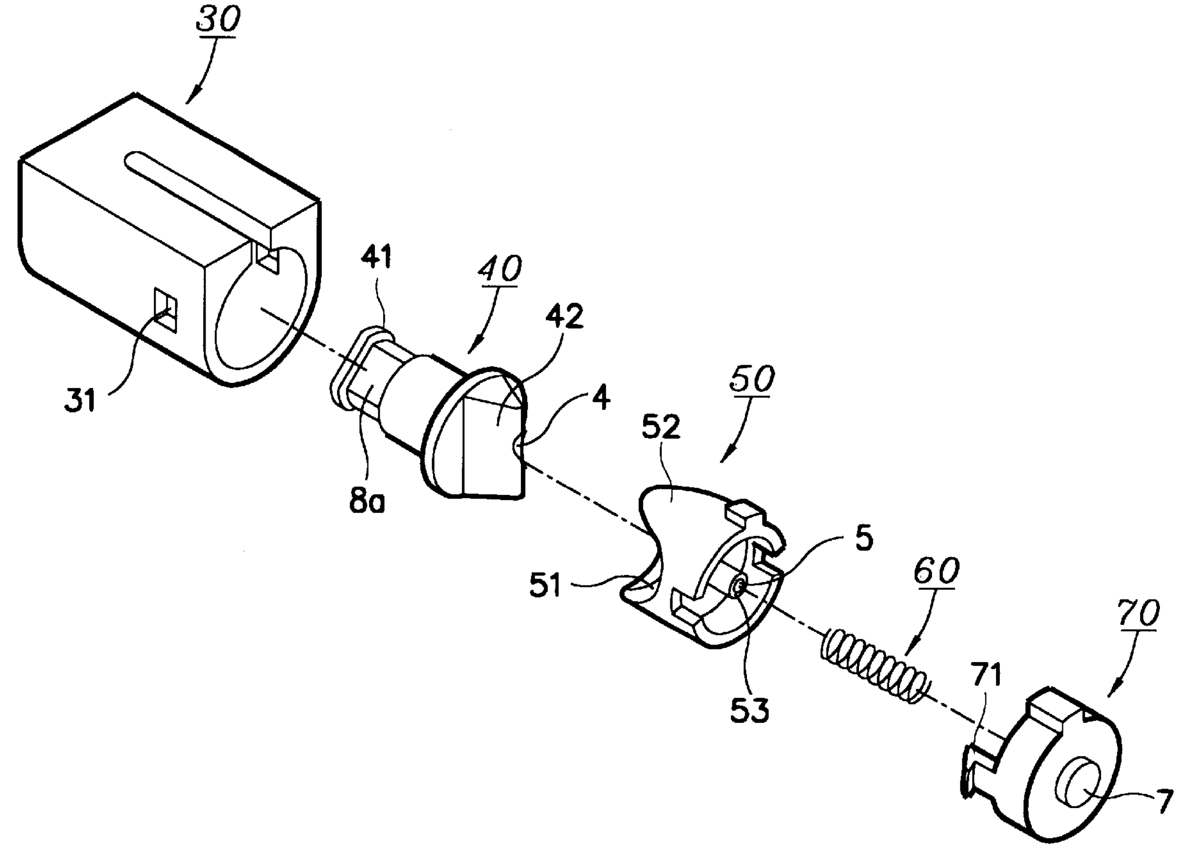
FIG. 3 is an exploded perspective view illustrating a hinge mechanism for closing and opening the flip of a flip-type radio phone according to an embodiment of the present invention.
Figure 4:
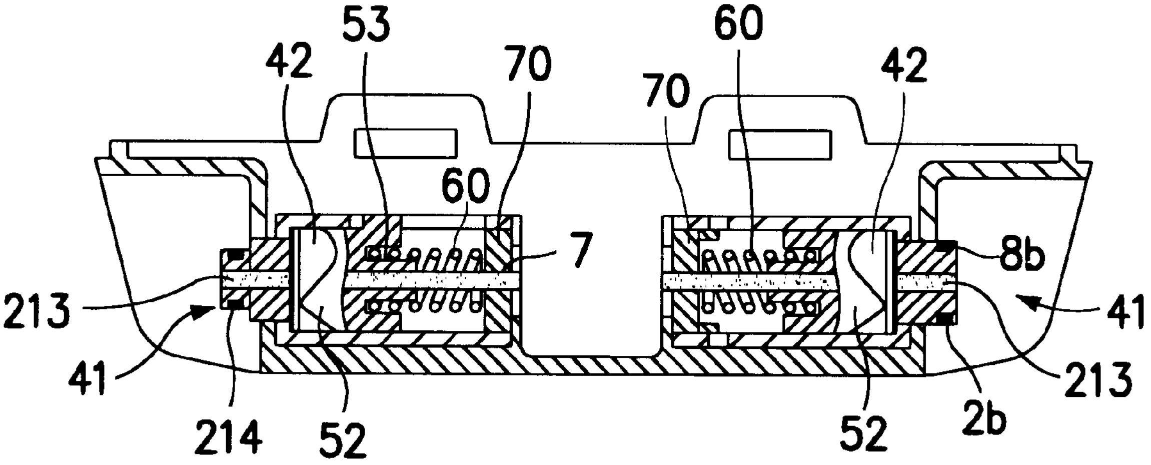
FIG. 4 is a partial cross sectional view illustrating the flip attached to the main set according to an embodiment of the present invention.

The arrangement of the microphone attachment in connecting device 202 is described with reference to FIGS. 3 and 4. Connecting device 202 for closing and opening the flip of a flip-type radio phone includes two hinge mechanisms 230, each symmetrically located at the juncture between the flip 201 and the main set 203, on the right and left sides of the phone, respectively. FIG. 3 is an exploded perspective view of a single hinge mechanism 230 according to a preferred embodiment of the present invention. Although one hinge mechanism is shown in FIG. 3, both hinge mechanisms are identical. Thus, while the following description describes the arrangement of one hinge mechanism, it is to be understood that the description equally applies to the arrangement of both hinge mechanisms. FIG. 4 is a partial cross sectional view illustrating the flip attached to the main set according to a preferred embodiment of the present invention.

Each hinge mechanism 230 includes a hinge housing 30 having a through hole 32, and a hinge shaft 40 inserted into hinge housing 30. The hinge shaft 40 has a shank 41. The hinge shaft 40 also has a projection 42 for engagement with a cam hinge 50. The end portion of shank 41 is projected through the outer end of through hole 32 of hinge housing 30. The cam hinge 50 has a depressed part 51 and a projected part 52 for engaging with projection 42 of hinge shaft 40. A hinge cover 70 is provided to cover hinge housing 30. The hinge cover 70 includes a hook 71 locked in a fastening hole 31 formed in hinge housing 30. A coil spring 60 is disposed between cam hinge 50 and hinge cover 70.

In order to mount core 213 of the transformer in hinge mechanism 230, there are provided axial holes 4, 5, 7 formed respectively along the central axes of hinge shaft 40, cam hinge 50 and hinge cover 70. Axial hole 4, located in hinge shaft 40, is dimensioned to firmly fix core 213. Axial holes 6 and 7, located in cam hinge 50 and hinge cover 70, respectively, are dimensioned to slide along core 213.

Figure 5:
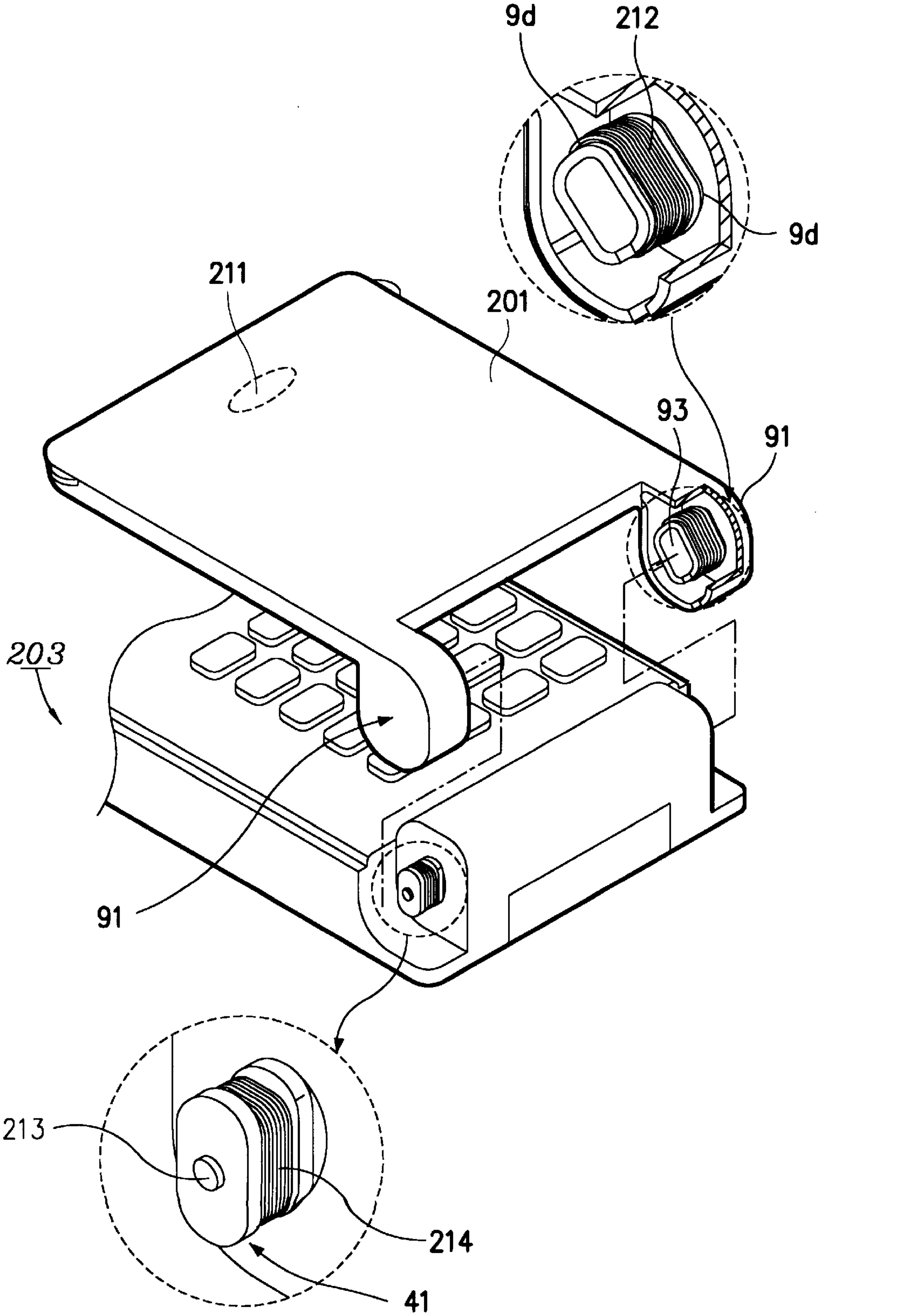
FIG. 5 is a partial perspective view illustrating the flip being attached to the main set according to an embodiment of the present invention.

Attachment of flip 201 to main set 203 according to a preferred embodiment of the present invention is described with reference to FIG. 4 in a partial cross sectional view, and to FIG. 5 in a partial perspective view. The projected end portions of shanks 41 of hinge shafts 40 have respective guide grooves 8 formed along their perimeters to guide secondary coil 214. Meanwhile, a pair of connecting parts 93 are formed in the neck portion 91 of flip 201 where the flip is attached to the main set. Each of connecting parts 93 has a receiving hole to engage with and enclose the projected end portion of the shank 41 on the main set 203. The connecting parts 93 have respective guide grooves 9 formed along their perimeters to guide primary coil 212 connected to microphone 211. Hence, when mounting flip 201 on main set 203, primary coil 212 which is wound around connecting part 93 encloses secondary coil 214 which is wound around the projected end portion of shank 41 of hinge shaft 40. Thus, core 213 is coaxially arranged in the common center of primary and secondary coils 212 and 214. While the primary and secondary coils are arranged in both ends of the connecting device in the present embodiment, it should be noted that they may be arranged in one end of the connecting device to perform a similar desired function.

When opening flip cover 201 to make a phone call, the curved surface between depressed part 51 and projected part 52 of cam hinge 50 cooperates slidingly with projection 42 of hinge shaft 40, so that cam hinge 50 reciprocates along core 213 until reaching the open fixed position. In this position, the projection 42 engages with depressed part 51 of cam hinge 50 with the help of the resilient force of coil spring 60. The closing of flip cover 201 is performed in the like manner.

The turns ratio of primary coil 212 to secondary coil 214 is made N:1. The voice signal generated by microphone 211 is transferred through the mutual electromagnetic inductance of primary and secondary coils 212 and 214 to amplifier 216 to the input terminal of the audio circuit of the main set 203. The variable resistor 215 determines the amplification factor of amplifier 216.

Accordingly, the audio signal generated by the microphone 211 mounted in flip 201 can be transferred to the audio circuit in main set 203 without using any mechanical contact between the microphone circuit and the audio circuit. Advantageously, this allows the flip-type radio phone to function properly even if the junction between flip 201 and main set 203 has been worn out. Furthermore, since the main set 203 contains all the circuit parts except the microphone 211 and the primary coil 212, the manufacturing process is simplified. Additionally, an impaired flip 201 may be more easily repaired.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An electrical contact free microphone attachment for a flip-type radio phone having a flip, a microphone mounted in said flip, a main set, an audio circuit installed in said main set, and a connecting device for connecting said flip with said main set, the microphone attachment comprising a transformer having a primary coil, a secondary coil and a core, wherein said primary coil is arranged in said flip to connect with said microphone, said secondary coil is arranged in said main set to connect with said audio circuit, the connecting device having an axial hole formed therein such that said core is fixedly arranged in said axial hole, wherein a signal path is established between said microphone and said audio circuit with no direct physical electrical contact therebetween.

2. The microphone attachment of claim 1, wherein said connecting device includes a main set portion connected to said main set and a flip portion connected to said flip.

3. The microphone attachment of claim 2, wherein said axial hole for receiving said core is formed in said main set portion of said connecting device.

4. The microphone attachment of claim 2, wherein said axial hole for receiving said core is formed in said flip portion of said connecting device.

5. The microphone attachment of claim 1, wherein said connecting device connects said main set to said flip at at least one physical mechanical juncture.

6. The microphone attachment of claim 5, wherein said microphone attachment is arranged in at least one of said physical mechanical junctures.

7. An electrical contact free microphone attachment and connection device arrangement for a flip-type radio phone having a flip, a microphone mounted in said flip, a main set, an audio circuit installed in said main set, said connecting device for connecting said flip with said main set, the microphone attachment and connection device arrangement comprising:

a pair of hinge housings each having through holes formed therein;

a pair of hinge shafts respectively inserted into each of said hinge housings through one end of the through holes to project an end portion of each of said hinge shafts out of the other end of each of said hinge housings;

a pair of cam hinges to respectively engage with said hinge shafts;

a pair of connecting parts formed in said flip to respectively engage with and enclose said projected end portions of said hinge shafts;

a pair of hinge covers to respectively cover each hinge housing;

a pair of coil springs respectively disposed between each of said cam hinges and said hinge covers;

said hinge shafts, said cam hinges and said hinge covers having portions forming axial holes along the central axes of said hinge shafts through said cam hinges and said hinge covers; and a transformer having a primary coil, a secondary coil and a core, wherein said core is fixedly arranged in said axial hole, said secondary coil is wound around said projected end portions of said hinge shafts containing said core to connect with said audio circuit, and said primary coil is wound around said connecting parts so as to connect with said microphone, thereby establishing a signal path between said microphone and said audio circuit with no direct physical electrical contact therebetween.

8. The microphone attachment of claim 7, wherein said projected end portions of said hinge shafts have guide grooves formed along their perimeters to guide said secondary coil.

9. The microphone attachment of claim 7, wherein said connecting parts have guide grooves formed along their perimeters to guide said primary coil.

10. The microphone attachment of claim 7, wherein said axial holes formed in said hinge shafts are dimensioned to firmly fix said core.

11. The microphone attachment of claim 10, wherein said axial holes formed in said cam hinges and said hinge covers are dimensioned to slide along said core.

12. An electrical contact free microphone attachment and connection device arrangement for a flip-type radio phone having a flip, a microphone mounted in said flip, a main set, an audio circuit installed in said main set, said connecting device for connecting said flip with said main set, the microphone attachment and connection device arrangement comprising:

a hinge housing having a through hole formed therein;

a hinge shaft inserted into said hinge housings through one end of the through hole to project an end portion of said hinge shaft out of the other end of said hinge housing;

a cam hinge to engage with said hinge shaft;

a connecting part formed in said flip to engage with and enclose said projected end portion of said hinge shaft;

a hinge cover to respectively cover said hinge housing;

a coil spring disposed between said cam hinge and said hinge cover;

said hinge shaft, said cam hinge and said hinge cover having portions forming axial holes along the central axes of said hinge shaft through said cam hinge and said hinge cover; and a transformer having a primary coil, a secondary coil and a core, wherein said core is fixedly arranged in said axial hole, said secondary coil is wound around said projected end portion of said hinge shaft containing said core to connect with said audio circuit, and said primary coil is wound around said connecting part so as to connect with said microphone, thereby establishing a signal path between said microphone and said audio circuit with no direct physical electrical contact therebetween.

* * * * *